Nov. 10, 1959 W. R. KNAPP 2,912,161
APPARATUS FOR OBTAINING SINE AND COSINE
FUNCTION MOTION FROM ROTARY MOTION
Filed Oct. 29, 1954 3 Sheets-Sheet 1

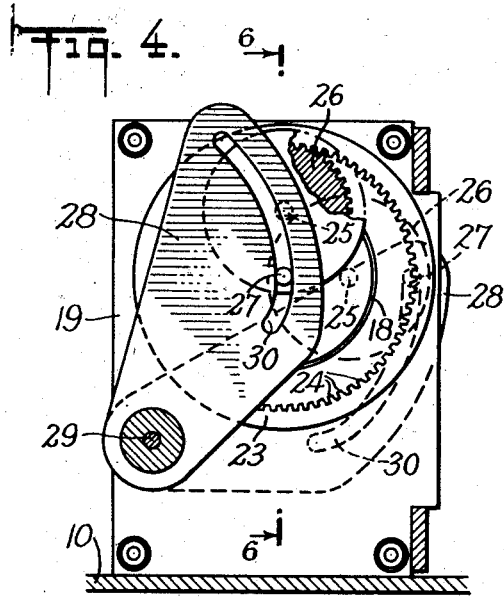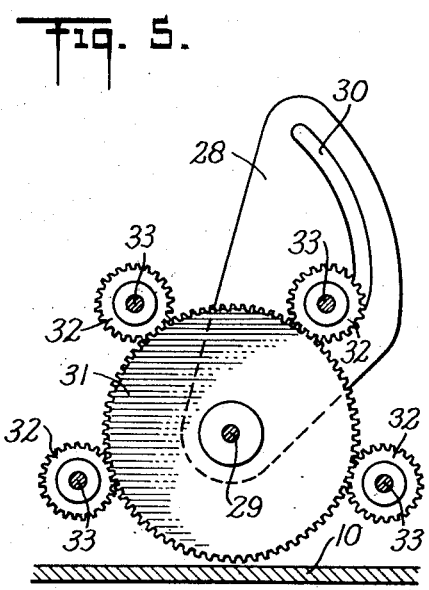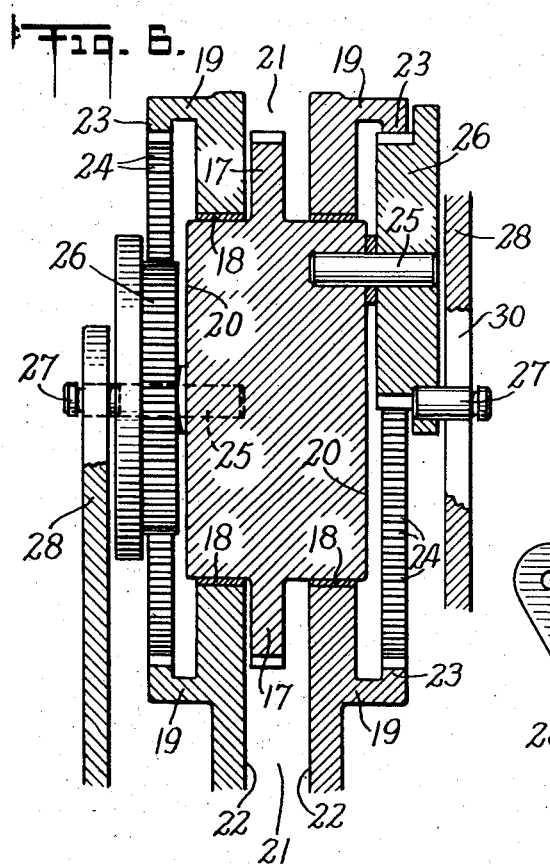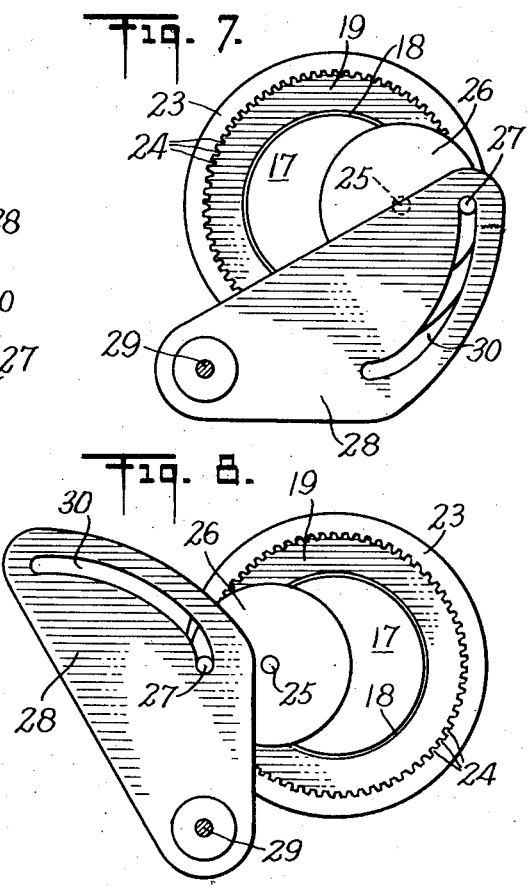

United States Patent Office 2,912,161
Patented Nov. 10, 1959

2,912,161

APPARATUS FOR OBTAINING SINE AND COSINE FUNCTION MOTION FROM ROTARY MOTION

Walter R. Knapp, Binghamton, N.Y., assignor to Link Aviation, Inc., Binghamton, N.Y., a corporation of New York Application October 29, 1954, Serial No. 465,622

1 Claim. (Cl. 235—61)

The present invention relates to an improved apparatus for the generation of trigonometric function motions, and more particularly, to apparatus for producing sine or cosine function voltages corresponding to shaft angular positions.

Sine and cosine voltage variations are employed extensively in analog computers, flight simulators, and other continuous functional computation systems; for example: any force which must be broken down into its "components" in a predetermined reference system, or any quantities which must be transformed from one reference system to a second reference system.

Sine and cosine function voltages have been provided heretofore from rotary motion by the use of potentiometers having cards with sine function shape. Sine and cosine potentiometers having such shaped cards are expensive to manufacture and must be ganged and phased by the potentiometer manufacturer, causing considerable difficulty and expense if it becomes necessary to change the system design. The present invention enables the use of less expensive linearly wound potentiometers for this purpose and eliminates the necessity for ganging potentiometers in phase where it is desired to operate a plurality of potentiometers from a common shaft.

Sine and cosine function voltages also have been provided heretofore from rotary motion by the use of a Scotch yoke mechanism in combination with a rack and pinion and a linearly wound potentiometer. It is, however, very difficult and expensive to construct a Scotch yoke with rack and pinion which will operate smoothly and easily. The tendency to bind and stick which occurs in a Scotch yoke mechanism is caused in part by the fact the driving pin in the Scotch yoke is axially misaligned from the rack in certain positions with the result that the pin has a tendency to rotate and thus bind the yoke. The present invention avoids the inherent operating difficulties of the Scotch yoke with rack and pinion arrangement.

Accordingly a general object of the present invention is to provide such a function generating device which is readily and economically manufactured on a mass basis, and which will enable sine and/or cosine angular displacements to be obtained from a rotating shaft with greater accuracy.

Another object of the invention is to provide improved means for generating or controlling electrical voltages in accordance with the sine and/or cosine functions of angles represented by rotatable shaft positions.

A more specific object of the invention is to provide a mechanism which will enable a plurality of sine and/or cosine function voltages to be obtained with a high degree of accuracy from a rotating shaft and as a function of shaft positions without the use of irregular shaped voltage cards.

Other objects of the invention will in part be obvious and will in part appear hereinafter.

The invention accordingly comprises the features of construction, combination of elements, and arrangements of parts, which will be exemplified in the construction hereinafter set forth, and the scope of the invention will be indicated in the claims.

For a fuller understanding of the nature and objects of the invention, reference should be had to the following detailed description taken in connection with the accompanying drawings in which:

Fig. 4 is an enlarged sectional view, taken substantially along line 4—4 of Fig. 1, with parts broken away, illustrating the epicyclic gear train and involute follower cam means;

Fig. 5 is an enlarged sectional view, taken substantially along line 5—5 of Fig. 1, illustrating the involute follower cam and gear train linkage used to connect a plurality of banks of potentiometers;

Fig. 6 is an enlarged transverse sectional view taken substantially along line 6—6 of Fig. 4;

Fig. 7 is a schematic elevation, illustrating the epicyclic gear train and involute follower cam in the extreme right position;

Fig. 8 is a schematic elevation, illustrating the epicyclic gear train and involute follower cam in the extreme left position.

Figure 1:
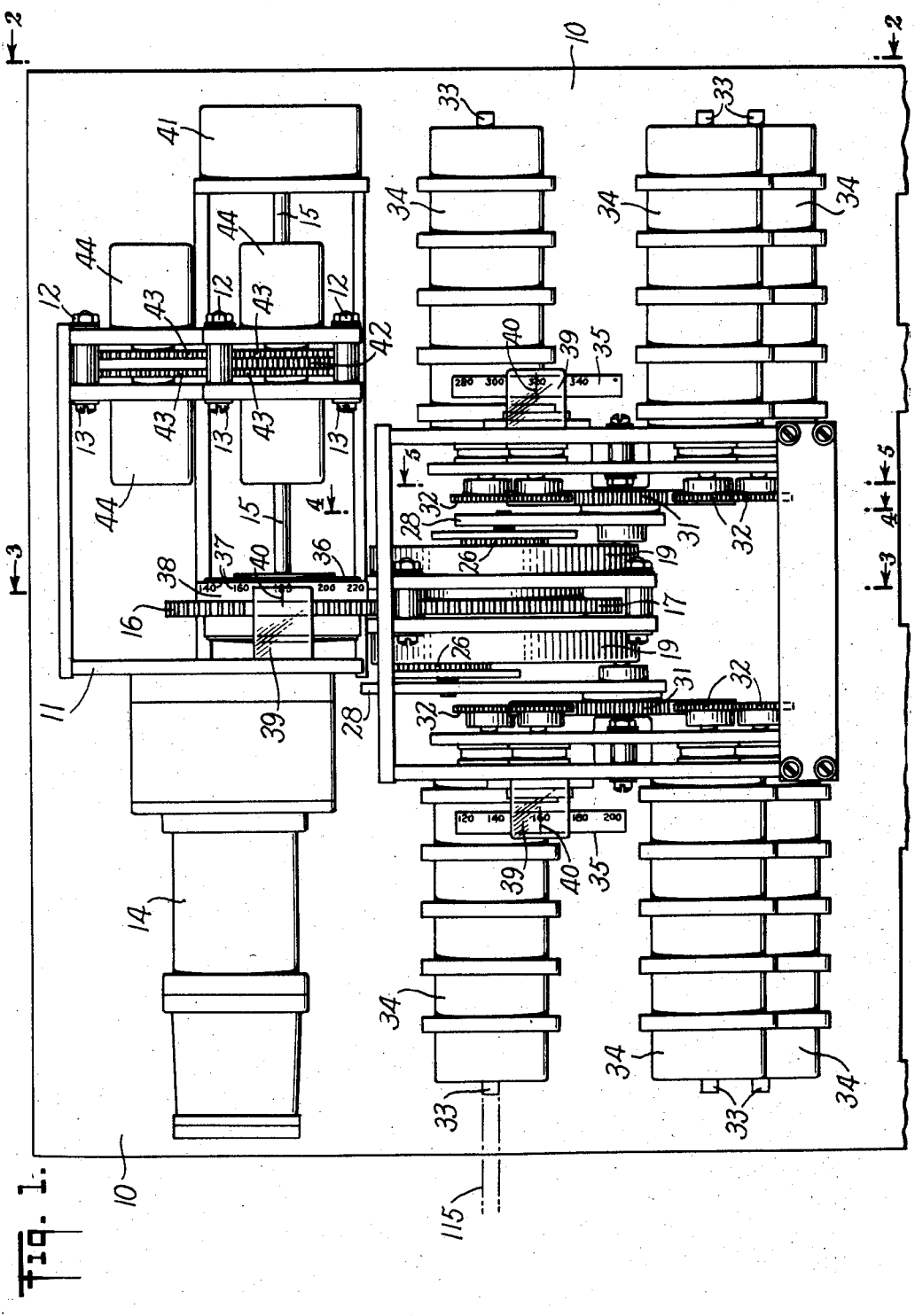
Fig. 1 is a top plan view illustrating one embodiment of an apparatus of the present invention for obtaining sine and cosine function voltage from rotary motion.

Referring to the drawings, in which like numerals identify similar parts throughout, it will be seen that, as illustrated in Fig. 1, the apparatus may include a platform 10 upon which the apparatus of the present invention may rest, and a frame 11 for rigidly holding the apparatus. The platform and frame may be constructed of wood, metal or plastic, but light-weight metal such as aluminum is preferable if the apparatus is to be used in an aircraft. The platform and frame may be fastened together by any suitable means such as welding, riveting or bolting. The frame may be constructed in separate parts which may if desired be fastened together with nuts 12, 12 and bolts 13, 13, or by other suitable means.

The apparatus may include a motor or driving mechanism 14 which is affixed to the frame 11. A drive shaft 15 may be connected to and extend from the driving mechanism which imparts rotary motion to the drive shaft. The drive shaft is coupled to and rotates a drive gear 16 which is in mesh with and rotates a gear 17. As shown in detail in Fig. 6, gear 17 rotates in bearing surfaces 18—18 within a housing 19 which is affixed in a suitable manner to frame 11. The bearing arrangement shown in Fig. 6 has the advantage of permitting both side surfaces 20—20 of gear 17 to be unobstructed by any fixed member and the double bearing surfaces 18—18 support gear 17 so that there is a minimum of side play or wobble of gear 17 as it is rotated by drive gear 16. A slot 21 between sides 22—22 of housing 19 permits the introduction of drive gear 16 which meshes with gear 17. Fixed to and extending from each side of housing 19 is a pair of ring gears 23—23 which have internal gear teeth 24, 24. The ring gears 23—23 extend laterally beyond the side surface 20 of gear 17 and the center line of the pitch circle of ring gears 23—23 coincides with the center line of gear 17.

Affixed to and extending from each side surface 20 of gear 17 is a pin 25. The center line of each pin 25 is offset from the center line of gear 17 a distance equal to one-half the distance between the pitch circle of ring gear 23 and the center line of gear 17. Therefore, when gear 17 rotates the center line of each pin 25 will describe a circle having a diameter equal to one-half the diameter of the pitch circle of each respective ring gear 23.

As illustrated in Fig. 4, a line extending from the center of each pin 25 to the center line of gear 17 forms an angle of 90 degrees, which enables sine and cosine motion to be obtained simultaneously from the apparatus.

A pair of epicycle gears 26—26, illustrated in Fig. 6, are each rotatably mounted on each of pins 25—25 and in mesh with each respective ring gear 23. The pitch diameter of each epicycle gear 26 is exactly one-half the pitch diameter of the respective ring gear 23 with which it meshes. When pins 25—25 are rotated by gear 17 through a circle equal to one-half the diameter of the pitch circle of the respetcive ring gears 23—23 each epicycle gear 26 is rotated with epicyclic motion within the respective ring gear.

The pitch diameter of each epicyclic gear 26 is exactly one-half the pitch diameter of each respective ring gear 23. Fixed to each epicyclic gear 26 (see Fig. 6) and centered exactly on the pitch circle of each epicyclic gear is a pin 27. As epicyclic gears 26—26 rotate, pins 27—27 move in a straight line and with simple harmonic motion across the diameter of ring gears 23—23. A pair of involute follower cams 28—28 are pivotally mounted on shafts 29—29 carried by housing 19 and each is provided with a slot 30 (see Fig. 4) through which pins 27 extend, respectively. Thus cams 28—28 follow pins 27—27 and convert the simple harmonic, straight line motion of the pins into rotary sine or cosine motion.

Figure 9:
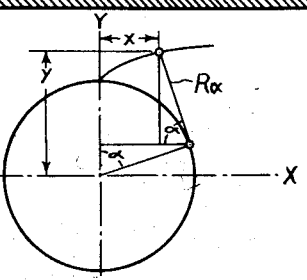
Fig. 9 is a geometric diagram of the generation of an involute curve.

The formula for the involute of the circle shown in Fig. 9 is known to be $$y = R \cos \alpha + R\alpha \sin \alpha$$
$$x = R \sin \alpha - R\alpha \cos \alpha$$

The involute therefore has the formula:

$$\frac{x}{y} = \frac{\sin \alpha - \alpha \cos \alpha}{\cos \alpha + \alpha \sin \alpha}$$

This formula may be used in designing the involute follower cams 28—28.

An involute cam can be generated in a milling machine in a fashion quite similar to the method by which gear teeth are generated and therefore a very high degree of precision in the shape of the involute cam may be obtained.

As illustrated in detail in Fig. 5, each involute follower cam 28 is fixed to a gear 31 which is concentric with the cam. A plurality of gears 32 are secured respectively to a plurality of output shafts 33 and mesh with gear 31 thus to rotate output shafts 33 which in turn may rotate banks of electrical equipment 34, 34 (Fig. 1), such as potentiometers; or output indicator dials 35, or the drive shaft 115 of another similar apparatus of the present invention which in turn will produce sine squared or cosine squared function motion.

Any desired number of linearly wound potentiometers, or other voltage deriving means such as inductive resolvers, may be added to either side of the present apparatus thereby obtaining a plurality of sine and/or cosine function voltages, thus facilitating flexibility in design and construction of computer systems. Not only may any number of potentiometers be driven by this one mechanism, but they may be of any desired resistance, and their number and resistance value may readily be changed at will. The mechanism is not limited to use with potentiometers, however, and synchros, variable inductance devices, variable capacitance devices, etc., may readily be used. In addition, the mechanism may also be employed where the sine and/or cosine motion output are coupled to drive other mechanical apparatus. For example, sine squared and/or cosine squared functions may be generated through the means of the present invention by coupling the output shaft of a first device as disclosed herein to the input shaft of a second similar device.

Figure 2:
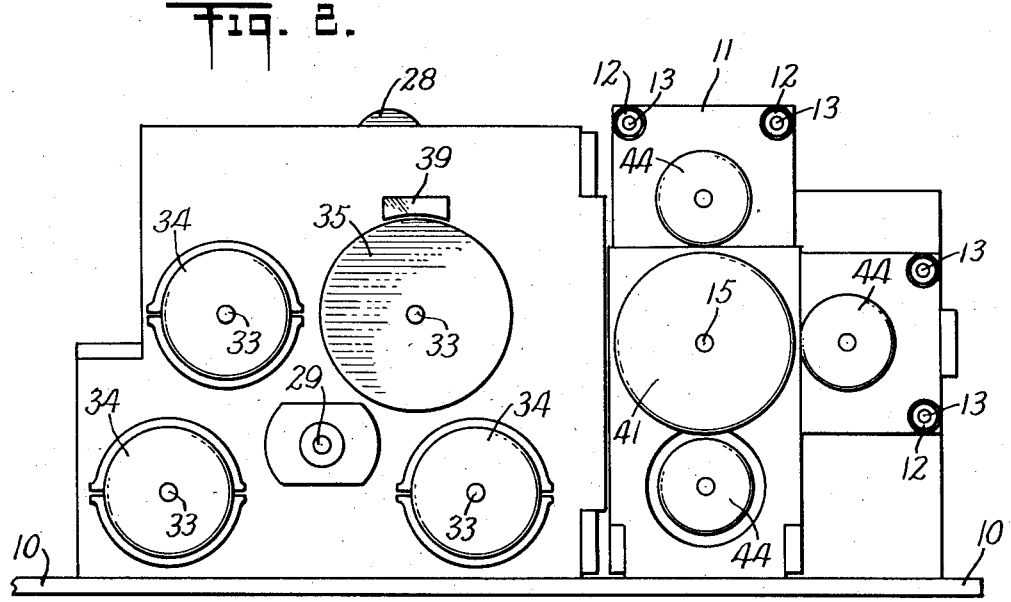
Fig. 2 is a side elevational view of the apparatus, taken substantially along line 2—2 of Fig. 1.
Figure 3:
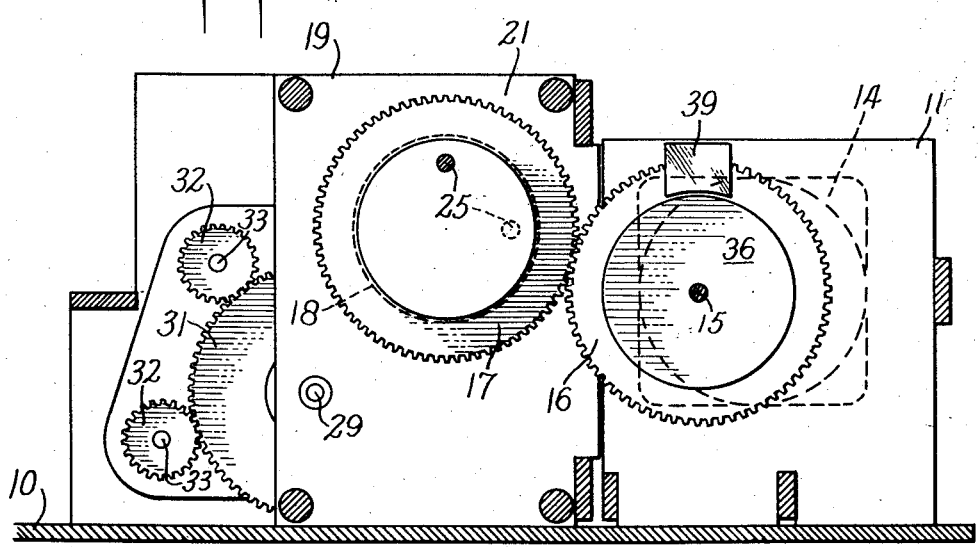
Fig. 3 is a sectional elevation of the apparatus, taken substantially along line 3—3 of Fig. 1.

In order to test the accuracy of the apparatus an input indicator dial 36 can be attached to drive gear 16 and numerals 37, 37 to indicate degrees or radians can be inscribed upon the face 38 of the dial. Another indicator dial 35 upon which is also inscribed degrees or radians can be attached to an output shaft 33 (Fig. 2). Readings can be taken on both the input indicator dial 36 and output indicator dial 35 before and after motor 14 is rotated. The output indicator dial should indicate the angle the output shaft turns when the drive shaft 15 turns through a measured angle.

A glass or plastic protector shield 39 may, if desired, be placed over each of the indicator dials to keep the dials cleaner, and an indicator line 40 may be inscribed on each shield to aid in reading the indicator dial more accurately.

A wiper arm of a standard servo follow-up potentiometer 41 may, if desired, be affixed to drive shaft 15. The electrical output from potentiometer 41 may then be fed back to motor 14, in the well-known manner of an electrical servo.

A gear 42 may, if desired, be affixed to drive shaft 15 to mesh with a plurality of gears 43 which may be fixed to the wiper arms of additional potentiometers 44, 44. Potentiometers 44, 44 may then, if desired, be electrically connected to other circuits.

As indicated hereinabove, the apparatus of the invention may be employed to operate other electrical devices than potentiometers as, for example, variable inductance devices and variable capacitance devices. The apparatus of the invention may also be employed in mechanical devices where sinusoidal angular motions are desired as, for example, in mechanical computers.

It will thus be seen that the objects set forth above, among those made apaprent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claim is intended to cover all of the generic and specific features of the invention herein described, and all statements of the scope of the invention which, as a matter of language, might be said to fall therebetween.

Having described my invention, what I claim as new and desire to secure by Letters Patent is:

A mechanism for deriving sine and cosine function voltages proportional to an angular movement of a rotatable shaft or other rotatable object comprising, in combination; a rotatable input shaft, a train of gears connected to said input shaft, a plurality of stationary ring gears, a rotatable shaft connected to a gear in said train of gears and concentric with each said gear ring, a plurality of epicyclic gears each having a pitch diameter equal to one-half the pitch diameter of the said gear ring within which each said epicyclic gear meshes, an extension from each end of said rotatable shaft, each said extension rotatably coupled to the center of each said epicyclic gear and each said extension at a 90° angle with the extension on the opposite end of said rotatable shaft with respect to the center line of said rotatable shaft, a pin mounted on each said epicyclic gear at the pitch circle of each said epicyclic gear, an involute follower cam in sliding contact with each said pin, a shaft rotatable by each said involute follower cam, a gear coupled to and concentric with each said shaft, a plurality of rotatable gears meshing with each said gear, a wiper arm coupled to each said rotatable gear, a circular electrical resistance element in sliding contact with each said wiper arm.

(References on following page)

References Cited in the file of this patent

UNITED STATES PATENTS

| | | |
|---|---|---|
| 2,080,186 | Reymond | May 11, 1937 |
| 2,212,799 | Sperry | Aug. 27, 1940 |
| 2,628,024 | Greenwood | Feb. 10, 1953 |
| 2,746,303 | Pollock | May 22, 1956 |
| 2,754,687 | Brandon | July 17, 1956 |

OTHER REFERENCES

Engineers' Sketch Book, by T. W. Barber, Chemical Publishing Co., of N.J., 1938, pp. 26, 27, 68 and 69.